(12) United States Patent
Zhang et al.

(10) Patent No.: US 9,392,559 B2
(45) Date of Patent: Jul. 12, 2016

(54) UPLINK INTERFERENCE SUPPRESSION IN A WIRELESS COMMUNICATION NETWORK

(71) Applicant: Telefonaktiebolaget L M Ericsson (publ), Stockholm (SE)

(72) Inventors: Zhang Zhang, Beijing (CN); Xinyu Gu, Beijing (CN); Henrik Nyberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/895,688

(22) PCT Filed: Jun. 8, 2013

(86) PCT No.: PCT/CN2013/076975
§ 371 (c)(1),
(2) Date: Dec. 3, 2015

(87) PCT Pub. No.: WO2014/194522
PCT Pub. Date: Dec. 11, 2014

(65) Prior Publication Data
US 2016/0119885 A1 Apr. 28, 2016

(51) Int. Cl.
*H04B 7/00* (2006.01)
*H04W 52/36* (2009.01)
*H04W 52/16* (2009.01)
*H04W 52/24* (2009.01)
(Continued)

(52) U.S. Cl.
CPC ............ *H04W 52/367* (2013.01); *H04W 52/16* (2013.01); *H04W 52/241* (2013.01); *H04W 52/44* (2013.01); *H04W 76/048* (2013.01); *H04W 52/242* (2013.01); *H04W 52/42* (2013.01)

(58) Field of Classification Search
None
See application file for complete search history.

(56) References Cited

U.S. PATENT DOCUMENTS 6,580,745 B1 * 6/2003 Kondo .................. H04B 7/2628
375/130
6,628,959 B1 * 9/2003 Hiramatsu .......... H04W 52/283
455/522

(Continued)

FOREIGN PATENT DOCUMENTS

CN 101459449 A 6/2009
CN 101711054 A 5/2010
(Continued)

OTHER PUBLICATIONS

High-Speed Uplink Packet Access by Antti Toskala, Harri Holma, and Karri Ranta-aho; WCDMA for UMTS: HSPA Evolution and LTE, Fifth Edition, 2010.

(Continued)

*Primary Examiner* — Dominic Rego
(74) *Attorney, Agent, or Firm* — Baker Botts, LLP

(57) ABSTRACT

A method and a controlling device of uplink interference suppression in a cell served by a base station of a wireless communication network are disclosed. The method comprises determining if there is a UE in the cell whose transmit power reaches its minimum transmit power limit, and when determining that the transmit power of the UE reaches its minimum transmit power limit, adjusting at least one parameter such that a Carrier-to-interference Ratio (CIR) for the UE in case that the UE transmits at the minimum transmit power limit is not greater than a target CIR for the UE that supports the lowest grantable uplink data rate of the UE.

26 Claims, 2 Drawing Sheets

(51) Int. Cl.
*H04W 52/44* (2009.01)
*H04W 76/04* (2009.01)
*H04W 52/42* (2009.01)

(56) References Cited

U.S. PATENT DOCUMENTS

| | | | | |
|---|---|---|---|---|
| 7,353,025 | B2* | 4/2008 | Ahn | H04L 1/0025 |
| | | | | 455/422.1 |
| 7,881,722 | B2* | 2/2011 | Gunnarsson | H04W 72/0486 |
| | | | | 455/435.2 |
| 2004/0085934 | A1* | 5/2004 | Balachandran | H04B 7/2628 |
| | | | | 370/335 |
| 2004/0192208 | A1* | 9/2004 | Kong | H04B 1/71072 |
| | | | | 455/63.1 |
| 2007/0173280 | A1* | 7/2007 | Nakayauchi | H04W 52/241 |
| | | | | 455/522 |
| 2008/0032684 | A1* | 2/2008 | Yagyu | H04W 52/40 |
| | | | | 455/420 |
| 2010/0058132 | A1* | 3/2010 | Kumar P R | H04L 1/0025 |
| | | | | 714/748 |
| 2010/0081469 | A1* | 4/2010 | Kazmi | H04W 52/241 |
| | | | | 455/522 |
| 2011/0218013 | A1* | 9/2011 | Jeon | H04W 52/34 |
| | | | | 455/522 |
| 2012/0238302 | A1* | 9/2012 | Pedersen | H04W 52/242 |
| | | | | 455/501 |
| 2012/0282889 | A1* | 11/2012 | Tanaka | H04J 11/0053 |
| | | | | 455/405 |

FOREIGN PATENT DOCUMENTS

| | | |
|---|---|---|
| CN | 102316568 A | 1/2012 |
| WO | WO 2013/008153 A2 | 1/2013 |

OTHER PUBLICATIONS

PCT International Search Report for International application No. PCT/CN2013/076975, Mar. 13, 2014.
IEEE Globecom 2010 Workshop on Femtocell Networks; Outage Analysis for WCDMA Femtocell with Uplink Attenuation by He Wang et al., 2010.
Uplink Interference Management for HSPA+ and 1xEVDO Femtocells by Yeliz Tokgoz et al., 2009.
3GPP TS 25.104 v8.3.0; Technical Specification; 3rd Generation Partnership Project; Technical Specification Group Radio Access Network; Base Station (BS) radio transmission and reception (FDD) (Release 8)--May 2008.
3GPP TS 25.331 v10.1.0; Technical Specification; 3rd Generation Partnership Project; Technical Specification Group Radio Access Network; Radio Resource Access Network; Radio Resource Control (RRC); Protocol specification (Release 10)--Sep. 2010.

* cited by examiner

UPLINK INTERFERENCE SUPPRESSION IN A WIRELESS COMMUNICATION NETWORK

PRIORITY

This nonprovisional application is a U.S. National Stage Filing under 35 U.S.C. §371 of International Patent Application Serial No. PCT/CN2013/076975, filed Jun. 8, 2013, and entitled "Uplink Interference Suppression in a Wireless Communication Network."

TECHNICAL FIELD

The present invention generally relates to uplink interference suppression in a wireless communication network.

BACKGROUND

With the deployment of 3G wireless communication networks, the demand for mobile data service has increased dramatically in recent years. To meet the demand, operators are continuously improving network capacity and coverage. Introducing small cells is an efficient way of improving the capacity and coverage and is becoming the preferred choice of operators. Typically, small cells are deployed at hot spots to provide additional capacity/throughput or at areas with poor signal coverage to provide coverage extension. In addition, due to the lower transmit (Tx) power in small cells, both the energy consumption and electromagnetic pollution of the User Equipments (UEs) and the base station (BS) are reduced.

As compared with a macro cell, the overall path loss between the UEs and the BS in a small cell is lower. For example, as a measure of the path loss, the BS to UE minimum coupling loss (MCL) may be 53 dB for a micro cell, 45 dB for a pico cell, and even 30-40 dB for a femtocell. Thanks to the low path loss, a UE in the small cell may transmit with relatively lower power than that in a macro cell, while guaranteeing a good uplink (UL) signal quality to support desired data rate and Quality of Service (QoS). However, sometimes the UL signal quality may become excessively good and cause a problem. FIG. 1 illustrates a schematic small cell. In the small cell, both a $UE_1$ and a $UE_2$ are served by a Node B 110. The $UE_1$ is located at the edge of the cell and the $UE_2$ is located close to the Node B 110. In a practical communication network, a UE may not decrease its Tx power below its minimum Tx power limit. It is possible that for one or more UE, e.g. $UE_1$, which are located very close to the Node B 110, the UL signal quality is still excessively good even if its Tx power has reached the minimum Tx power. In other words, the Tx power of the UE is more than needed. This is the so-called saturation problem. Such a problem may desensitize the Node B receiver and result in several negative impacts on UL. For example, it may lead to excessive UL interference to other UEs, especially to the UEs in the same cell, and in turn lead to waste of UE Tx power for both the UEs limited by the minimum Tx power and other UEs. Furthermore, the excessively good UL signal quality leads to a conservative use of the allocated load, which means that the other co-cell UEs will have less load headroom available. The decreased UL performance and the inefficient usage of UE energy caused by the saturation problem are undesirable.

A solution is proposed in "Uplink Interference Management for HSPA+ and 1×EVDO Femtocells", by Yan Zhou, Mehmet Yavuz and Sanjiv Nanda, GLOBECOM'09 Proceedings of the 28th IEEE conference on Global telecommunications, Pages 4626-4632. In the solution, the Node B receiver is desensitized by attenuating the signal at the Node B receiver on purpose, which leads to a higher noise figure. The attenuation pulls the UEs with low coupling loss to a power controllable range and thus avoids transmitting at the minimum Tx power.

Although desensitizing the Node B receiver by attenuating the signal at the Node B receiver may avoid the UEs with low coupling loss transmitting at minimum Tx power, it does not really solve the problem. With desensitization, the UEs that originally transmit at minimum Tx power have to transmit at higher Tx power to achieve the same UL quality and data rate. As a result, the generated interference after attenuation and the consumed load headroom do not really decrease. The UEs that do not have the saturation problem will also need to increase their Tx power for achieving the same data rate due to desensitization, i.e. the problem of wasting UE Tx power is not mitigated but further deteriorated in the sense that more Tx power is needed to support the same data rate. Moreover, the increased UE Tx power will lead to an increased interference and consequently a decreased UL performance.

SUMMARY

Therefore, it is an object to solve at least one of the above-mentioned problems.

According to an aspect of the invention, a method of UL interference suppression in a cell served by a base station of a wireless communication network is provided. The method comprises determining if there is a UE in the cell whose Tx power reaches its minimum Tx power limit, and when determining that the Tx power of the UE reaches its minimum Tx power limit, adjusting at least one parameter such that a Carrier-to-Interference Ratio (CIR) for the UE in case that the UE transmits at the minimum Tx power limit is not greater than a target CIR for the UE that supports the lowest grantable UL data rate of the UE.

According to another aspect of the invention, a controlling device for UL interference suppression in a cell served by a base station of a wireless communication network is provided. The controlling device comprises a determining unit adapted to determine if there is a UE in the cell whose Tx power reaches its minimum Tx power limit, and a parameter adjusting unit adapted to, when the determining unit determines that the Tx power of the UE reaches its minimum Tx power limit, adjust at least one parameter such that a CIR for the UE in case that the UE transmits at the minimum Tx power limit is not greater than a target CIR for the UE that supports the lowest grantable UL data rate of the UE.

According to a further aspect of the invention, a base station or a Radio Network Controller (RNC) including the above-mentioned controlling device is provided.

In this way, when the UE is transmitting at the minimum Tx power, the UL signal quality will not be excessively good and the saturation problem may be solved or alleviated.

BRIEF DESCRIPTION OF THE DRAWINGS

The invention will be described in detail by reference to the following drawings, in which.

DETAILED DESCRIPTION

Figure 1:
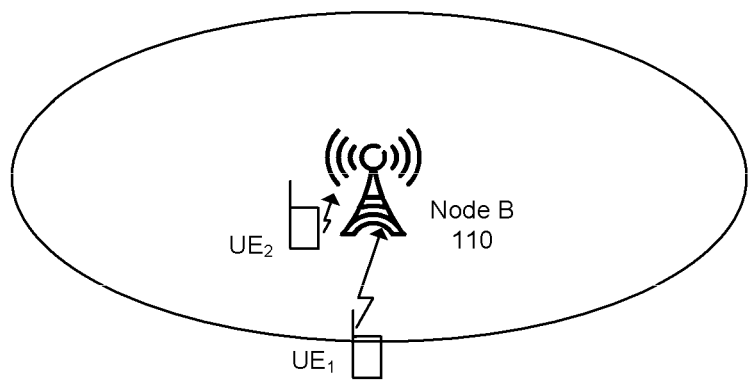
FIG. 1 illustrates a schematic small cell.

Embodiments of the present invention will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the invention is described with reference to the Wideband Code Division Multiple Access (WCDMA) communication network in the context, the skilled in the art should understand that the invention is not limited to this, but can indeed be applied to all existing and future wireless communication networks that have the saturation problem. Although specific terms in some specifications are used here, such as Node B and UE, it should be understand that the invention is not limited to those specific terms but can be applied to all similar entities.

Embodiments of the invention will be described below with reference to the drawings.

The saturation problem is due to the fact that the UL quality for one or more UE is better than needed even if the Tx power of the UE has reached its minimum Tx power. It is proposed to solve the problem by adjusting one or more parameters such that the UL signal quality of the UE in case that the UE transmits at the minimum Tx power will not be greater than a target UL signal quality that supports the lowest grantable UL data rate of the UE. UL From another perspective, the fact that the UL signal quality of the UE when the UE transmits at the minimum Tx power is greater than the target UL signal quality that supports the lowest grantable UL data rate of the UE indicates that the UL signal quality is better than needed, and the saturation problem will occur. The UL signal quality may be indicated by, e.g. CIR or other measurements.

Figure 2:
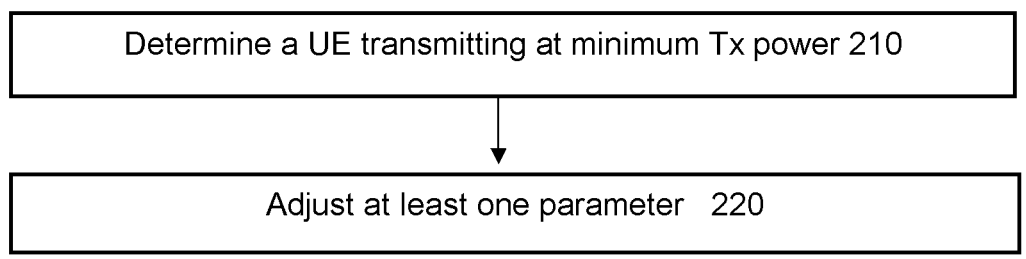
FIG. 2 illustratively shows a method 200 of UL interference suppression in a cell served by a base station of a wireless communication network according to an embodiment of the invention.

FIG. 2 illustratively shows a method 200 of UL interference suppression in a cell served by a base station of a wireless communication network according to an embodiment of the invention.

At step 210, it is determined if determining if there is a UE in the cell whose Tx power reaches its minimum Tx power limit. The UE transmitting at its minimum Tx power limit is likely to have the saturation problem. At step 220, when it is determined, at least one parameter is adjusted such that a CIR for the UE in case that the UE transmits at the minimum Tx power limit is not greater than a target CIR for the UE that supports the lowest grantable UL data rate of the UE. The at least one adjustable parameter may include a maximum allowable Rise-over-Thermal (RoT) of the cell and an UL data rate to be granted to the UE.

An exemplary embodiment of adjusting the maximum allowable RoT of the cell will be discussed hereinafter.

The target CIR for the UE that supports the lowest grantable UL data rate of the UE may be obtained. For example, in a High-Speed Packet Access (HSPA) network, the CIR of the UL depends on the UL dedicated physical control channel (DPCCH) CIR and the data rate, while the data rate corresponds to a certain enhanced dedicated channels (E-DCH) to DPCCH power offset, i.e. $CIR = CIR_{DPCCH} * (1 + offset_{EDCH\_DPCCH})$. The target CIR is the CIR that corresponds to the lowest possible data rate and in turn the lowest $offset_{EDCH\_DPCCH}$ (equal to or substantially equal to zero). In a practical network, the $CIR_{DPCCH}$ is available in, e.g. a RNC and the $offset_{EDCH\_DPCCH}$ may be predefined. The target CIR for the UE that supports the lowest grantable UL data rate of the UE may be a known parameter, or may be derived without difficulty, e.g. by taking a minimum CIR which supports UL physical control channel for the UE.

Then a RoT threshold is calculated based on the target CIR for the UE, a power of noise at the base station and a minimum Tx power limit of the UE. The maximum allowable RoT of the cell is a parameter available in, e.g. the RNC. The maximum allowable RoT of the cell is compared with the calculated RoT threshold. If the maximum allowable RoT of the cell is lower than the calculated RoT threshold, the maximum allowable RoT of the cell is configured to be higher than or equal to the calculated RoT threshold.

The RoT threshold may be calculated by the following formula:

$$RoT\ threshold = \frac{P_{min}}{P_{noise} \cdot L} \cdot \left[\frac{G_{div}}{CIR_{target}} + (1-\alpha)\right] \quad (1)$$

where $CIR_{target}$ represents the target CIR for the UE, $G_{div}$ represents a diversity gain at the base station, $P_{min}$ represents the minimum Tx power limit of the UE, $P_{noise}$ represents a noise power at the base station, L represents a path loss between the UE and the base station, and α represents a degree of orthogonality of transmission links from the UE to the base station. The parameters of $G_{div}$, α and $P_{noise}$ can be estimated at the base station. The parameter L may be determined by the base station by various ways. For example, L can be determined based on MCL, e.g. L=K*MCL, where K is a configurable parameter no less than 1. The value of MCL depends on base station or cell type, for instance, MCL equals 45 dB for a pico cell, and L may be set to $K*10^{(45/10)}$. In another example, the base station may collect the cell path loss statistics (this can be done during the cell planning phase), and adopt the K % (e.g. 5%) percentile path loss.

If the maximum allowable RoT of the cell is higher than or equal that the RoT threshold as calculated in the formula (1), the RoT of the cell, which equals $(P_{total}+P_{noise})/P_{noise}$ may be increased to be greater than or equal to the RoT threshold if necessary. That is, $$(P_{total} + P_{noise})/P_{noise} >= \frac{P_{min}}{P_{noise} \cdot L} \cdot \left[\frac{G_{div}}{CIR_{target}} + (1-\alpha)\right] \quad (2)$$

It can be derived from the formula (2)

$$\frac{G_{div} \cdot P_{min}/L}{P_{total} + P_{noise} - (1-\alpha) \cdot P_{min}/L} <= CIR_{target} \quad (3)$$

The left side of the formula (3) is the CIR of the UE that is transmitting at its minimum Tx power. As long as the maximum allowable RoT of the cell is higher than or equal that the RoT threshold, the formula (3) is satisfied, which means that when the UE is transmitting at its minimum Tx power, its UL signal quality is not better than the target UL signal quality that supports the lowest grantable UL data rate of the UE, and certainly not better than the UL signal quality that supports another data rate. In other words, the UL signal quality is not excessively good and the saturation problem will be avoided.

In a WCDMA network, the RoT threshold may be determined either in the RNC or in the Node B. In the former case, the Node B may inform the RNC of the $G_{div}$, α, $P_{noise}$ and L, and then the RNC calculates the RoT threshold according to formula (1) and configures the maximum allowable RoT to be higher than or equal to the calculated RoT threshold. In a practical network, these parameters may take typical values obtained from simulation/field test. In the later case, the RNC may inform Node B of the $CIR_{target}$, and then the Node B may calculate the RoT threshold by itself according to formula (1) and modify the maximum allowable RoT informed by the RNC to be higher than or equal to the RoT threshold. The RoT threshold may be adapted dynamically since the $CIR_{DPCCH}$ may vary due to outer loop power control and other parameters such as α and $P_{noise}$ may also vary over time. For these parameters, filtered values may be used to improve accuracy.

The RoT threshold is a lower bound set on the maximum allowable RoT. In another embodiment, a higher bound may be set on the maximum allowable RoT, where the higher bound may be e.g. determined based on cell coverage requirement.

The adjusting of the maximum allowable RoT may performed in advance or may be triggered by the determination of the UE transmitting at the minimum Tx power limit. For example, the RNC may determine that a UE is transmitting at the minimum Tx power limit when the RNC receives from the UE an Event 6c as defined in 3GPP TS 25.331, "Radio Resource Control (RRC); Protocol specification (Release 10)", V10.1.0, indicating that the UE Tx power reaches the minimum Tx power limit. The RNC may use Node B Application Part (NBAP) signaling to inform the Node B of the determination. In another example, the CIR for the current UL physical control channel such as DPPCH for the UE is estimated. If the estimated CIR for the current UL physical control channel exceeds a minimum CIR which supports the UL physical control channel for the UE by a predetermined threshold for a predetermined time period, e.g. for consecutive n slots, it implies that the UE cannot further decrease its Tx power although the UL signal quality for the UE is better than a target quality. It may be determined that the UE transmits at the minimum Tx power limit.

Next, an exemplary embodiment of adjusting the UL data rate to be granted to the UE will be discussed.

The CIR for the UE in case that the UE transmits at the minimum Tx power limit may be estimated based on a power of noise at the base station ($P_{noise}$) a total received power at the base station ($P_{total}$) and the minimum Tx power limit of the UE ($P_{min}$). For example, the CIR may be estimated by the following formula:

$$CIR = \frac{G_{div} \cdot P_{min}/L}{P_{total} + P_{noise} - (1-\alpha) \cdot P_{min}/L} \quad (4)$$

A first UL data rate threshold of the UE supported by the estimated CIR may be calculated. There is a mapping relation between the data rate and the CIR. A higher CIR supports a higher data rate, and vice versa. The current UL data rate of the UE is then compared with the first UL data rate threshold. If the current UL data rate of the UE is lower than the first UL data rate threshold, this implies that the UE transmitting at its minimum Tx power is using an UL data rate lower than the data rate the UL signal quality could have supported. An UL data rate that is higher than or equal to the first UL data rate threshold is then granted to the UE. A higher data rate needs a better UL signal quality. Therefore, the situation that the UL signal quality of the UE is better than needed will be changed, and the saturation problem may be avoided.

In addition to calculating a data rate threshold as discussed above, the granted data rate may be calculated by other means, which will discussed below. The saturation problem may be solved as long as the UE transmitting at the minimum Tx power is granted a certain higher data rate.

For the UE that is determined to be transmitting at the minimum Tx power, an data rate (power offset) increase grant may be sent to the UE regardless whether or not the UE requests a higher data rate. The granted data rate (power offset) may be adapted based on the data rate (power offset) supported at the minimum Tx power. For instance, $$\text{offset}_{EDCH\_DPCCH}^{grant} = \max(\text{offset}_{EDCH\_DPCCH}^{priorart}, k \cdot \text{offset}_{EDCH\_DPCCH}^{min\,power})$$

where $\text{offset}_{EDCH\_DPCCH}^{grant}$ is the EDCH to DPCCH power offset to be granted to the UE, $\text{offset}_{EDCH\_DPCCH}^{priorart}$ is the EDCH to DPCCH power offset calculated with prior art methods (e.g. that in Harri Holma and Antti Toskala, "WCDMA FOR UMTS HSPA Evolution and LTE", Fifth Edition), $\text{offset}_{EDCH\_DPCCH}^{min\,power}$ is the EDCH to DPCCH power offset supported at minimum UE Tx power, and k is a configurable adjustment parameter. The right side of the formula may be considered to be the first UL data rate threshold.

The offset$_{EDCH\_DPCCH}^{min\ power}$ may be determined either in the Node B or in the RNC, and equals offset$_{EDCH\_DPCCH}^{current}$*(DPPCH CIR$_{estimated}$/DPPCH CIR$_{target}$), where offset$_{EDCH\_DPCCH}^{current}$ is the EDCH to DPCCH power offset currently used by the UE which can be known from E-DPCCH, DPPCH CIR$_{estimated}$ is the estimated DPPCH CIR before the data rate granting, and DPPCH CIR$_{target}$ is the target DPPCH CIR before the data rate granting.

Adjusting the UL data rate to be granted to the UE or the UL power is an efficient way to solve the saturation problem. However, when a UE transmits at minimum Tx power and only transmits with the UL physical control channel, e.g. DPCCH, obviously all the power will be used for DPCCH. In this case if the UE requests an UL data transmission and the system grants a certain data rate to the UE, the UE Tx power will suddenly increase to an unnecessarily high level. Assuming that the UE can still support the granted data rate at the minimum Tx power, but due to the fact that the inner loop power control (ILPC) can not decrease the DPCCH power instantaneously, the DPCCH power will still transmit at the minimum Tx power initially after the data rate increase, which may lead to unnecessarily high consumption of UE Tx power and excessive interference. The same problem may also exist if the UE transmits at very low data rate where most of the UE Tx power is used for DPCCH.

To alleviate the problem that the ILPC can not decrease the DPCCH power instantaneously, when granting the UE an adjusted UL data rate, it is determined if the current UL data rate of the UE is lower than a second UL data rate threshold. The second UL data rate is lower than the first UL data rate, and may take typical values obtained from simulation/field test. If the current UL data rate of the UE is lower than the second UL data rate threshold, which implies that the current UL data rate is too low, the UL data rate to be granted is ramped up, instead of being increased too rapidly. The step size of increasing the data rate/power is slow so that the ILPC has time to decrease the UL physical control channel power and thus the overall UE Tx power until the UE minimum Tx power is reached. The rate of ramping up may be dependent on a power offset between the UL physical data channel such as EDCH and the UL physical control channel such as DPCCH. For instance, offset$_{EDCH\_DPCCH}^{grant}$ can be set to w·offset$_{EDCH\_DPCCH}^{priorart}$ and w can be set smaller than 1.

When there is data transmission UE may continue decreasing DPCCH power as long as the estimated DPCCH CIR is higher than target DPCCH CIR even the UE minimum Tx power is hit, this will lead to an increased EDCH to DPCCH power offset which may exceed the granted power offset. In this case, UE can optionally adapt data rate based on the actual adopted power offset, which is higher than the granted data rate. When the UE requires a higher data rate, there are two options. In a first option, the network does not know the UE's capability of decreasing DPCCH power at minimum Tx power, and the UE can simply discard the grant from the system if the granted data rate is lower than its current data rate and continue asking for higher data rate, this will trigger the system to grant a even higher data rate. In the second option, the network knows the UE's capability of decreasing DPCCH power at minimum Tx power, and the system can estimate the data rate that the UE is using (e.g. based on offset$_{EDCH\_DPCCH}^{current}$*DPPCH CIR$_{estimated}$/DPPCH CIR$_{target}$) and grant a higher data rate based on that estimation. Optionally, the RNC or Node B may prohibit scheduling for a while and resume after the ILPC converges, which can be detected based on the fact that the difference between DPPCH CIR$_{estimated}$ and DPPCH CIR$_{target}$ is smaller than a certain threshold or there is no consecutive Tx power Control (TPC) down. Larger data rate can be granted after the scheduling is resumed without generating excessive interference as DPCCH power has already been adjusted properly.

Another approach to alleviate the problem that the ILPC can not decrease the DPCCH power instantaneously is to increase discontinuous transmission (DTX) period or switch to a transmission state such as cell_FACH with less UL physical control channel transmission when determining that the UE transmits at the minimum Tx power limit.

Figure 3:
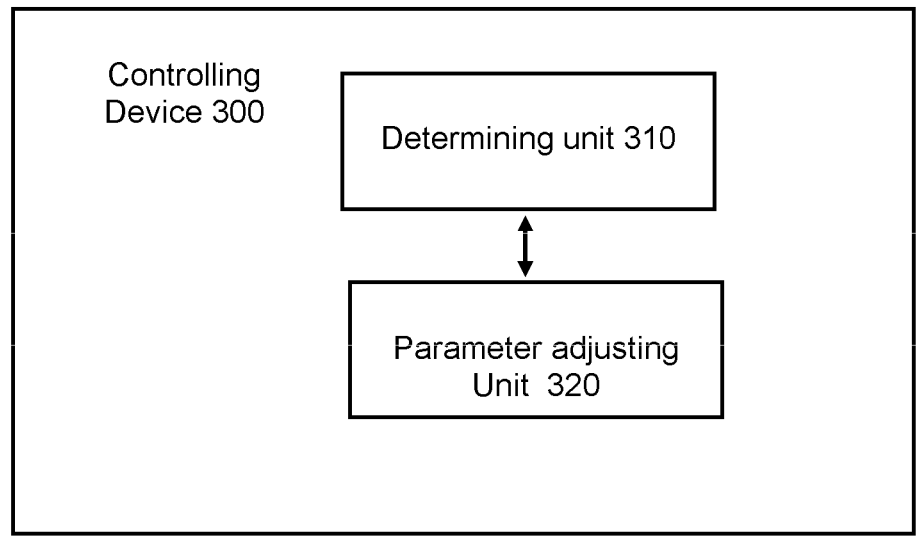
FIG. 3 illustratively shows a block diagram of a controlling device 300 for UL interference suppression in a cell served by a base station of a wireless communication network in accordance with an embodiment of the invention.

FIG. 3 illustratively shows a block diagram of a controlling device 300 for UL interference suppression in a cell served by a base station of a wireless communication network in accordance with an embodiment of the invention.

The controlling device 300 may be implemented in a base station such as a Node B or another communication node such as a RNC. The controlling device 300 comprises a determining unit 310 adapted to determine if there is a UE in the cell whose Tx power reaches its minimum Tx power limit, and a parameter adjusting unit 320 adapted to, when the determining unit determines that the Tx power of the UE reaches its minimum Tx power limit, adjust at least one parameter such that a CIR for the UE in case that the UE transmits at the minimum Tx power limit is not greater than a target CIR for the UE that supports the lowest grantable UL data rate of the UE. The at least one parameter may include a maximum allowable RoT of the cell. The parameter adjusting unit 320 is further adapted to obtain the target CIR for the UE, calculate a RoT threshold based on at least the target CIR, a power of noise at the base station and a minimum Tx power limit of the UE, and compare a maximum allowable RoT of the cell with the calculated RoT threshold, and configure the maximum allowable RoT of the cell to be higher than or equal to the calculated RoT threshold if the maximum allowable RoT of the cell is lower than the calculated RoT threshold. The RoT threshold may be calculated by $$RoT\ threshold = \frac{P_{min}}{P_{noise} \cdot L} \cdot \left[ \frac{G_{div}}{CIR_{target}} + (1-\alpha) \right]$$

where CIR$_{target}$ represents the target CIR for the UE, G$_{div}$ represents a diversity gain at the base station, P$_{min}$ represents the minimum Tx power limit of the UE, P$_{noise}$ represents a noise power at the base station, L represents a path loss between the UE and the base station, and α represents a degree of orthogonality of transmission links from the UE to the base station. The determining unit 310 may be further adapted to take a minimum CIR which supports UL physical control channel for the UE as the target CIR.

The at least one parameter may include an UL data rate to be granted to the UE. The parameter adjusting unit 320 may be further adapted to estimate the CIR, for the UE in case that the UE transmits at the minimum Tx power limit, based on a power of noise at the base station, a total received power at the base station and the minimum Tx power limit of the UE, calculate a first UL data rate threshold of the UE supported by the estimated CIR, compare the current UL data rate of the UE with the first UL data rate threshold, and grant the UE a UL data rate that is higher than or equal to the first UL data rate threshold if the current UL data rate of the UE is lower than the first UL data rate threshold. The parameter adjusting unit 320 may be is further adapted to estimate the CIR in case that the UE transmits at the minimum Tx power limit by $$CIR = \frac{G_{div} \cdot P_{min} / L}{P_{total} + P_{noise} - (1-\alpha) \cdot P_{min} / L}$$

where G$_{div}$ represents a diversity gain at the base station, P$_{min}$ represents the minimum Tx power limit of the UE, P$_{noise}$ represents a noise power at the base station, L represents a path loss between the UE and the base station, $P_{total}$ represents a total received power at the base station and α represents a degree of orthogonality of transmission links from the UE to the base station.

The determining unit 310 may be further adapted to receive an event that the UE Tx power reaches the minimum Tx power limit, and determine that the Tx power of the UE reaches its minimum Tx power limit. The determining unit 310 may be further adapted to estimate a CIR for the current UL physical control channel for the UE, and determine that the UE transmits at the minimum Tx power limit if the estimated CIR for the current UL physical control channel exceed a minimum CIR which supports the UL physical control channel for the UE by a predetermined threshold for a predetermined time period.

The determining unit 310 may be further adapted to determine if the current UL data rate of the UE is lower than a second UL data rate threshold, the second UL data rate being lower than the first UL data rate, and the parameter adjusting unit 320 may be further adapted to ramp up the UL data rate to be granted to the UE if the current UL data rate of the UE is lower than a second UL data rate threshold. The rate of ramping up may be dependent on a power offset between an UL physical data channel and the UL physical control channel. The parameter adjusting unit 320 may be further adapted to increase discontinuous transmission, DTX, period or switching to a transmission state with less UL physical control channel transmission when determining that the UE transmits at the minimum Tx power limit.

Figure 4:
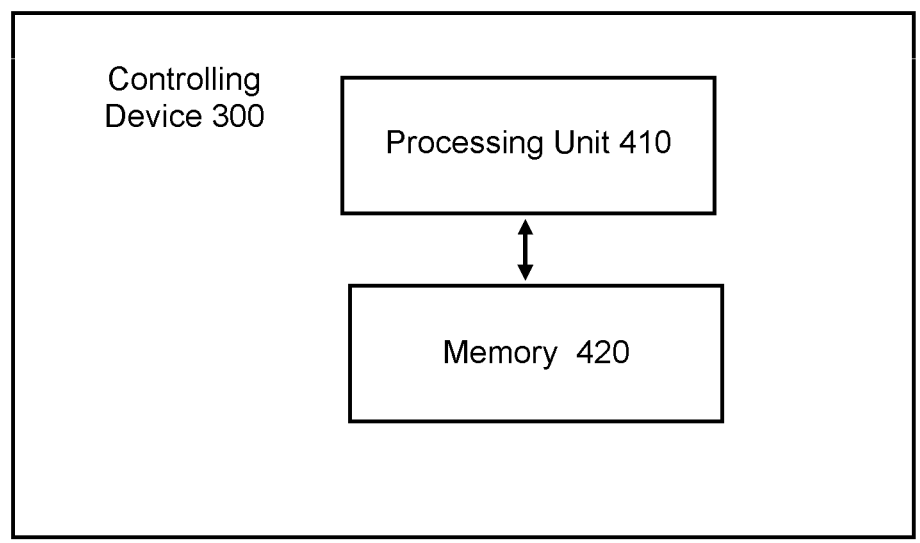
FIG. 4 shows a schematic block diagram of a software-based implementation of a controlling device 400 in accordance with an embodiment of the invention.

FIG. 4 shows a schematic block diagram of a software-based implementation of a controlling device 400 in accordance with an embodiment of the invention. Here, the controlling device 400 comprises a processing unit 410, which may be provided on a single chip or a chip module and which may be any processor or computer device with a control unit that performs control based on software routines of a control program stored in a memory 420. Program code instructions are fetched from the memory 420 and loaded into the control unit of the processing unit 410 in order to perform the steps described in connection with FIG. 2. The controlling device 400 may share the same processing unit or memory with the base station, or use separate hardware.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. A method of uplink interference suppression in a cell served by a base station of a wireless communication network, said method comprising:
   determining if there is a User Equipment, UE, in the cell whose transmit power reaches its minimum transmit power limit; and
   when determining that the transmit power of the UE reaches its minimum transmit power limit, adjusting at least one parameter such that a Carrier-to-Interference Ratio, CIR, for the UE in case that the UE transmits at the minimum transmit power limit is not greater than a target CIR for the UE that supports the lowest grantable uplink data rate of the UE.

2. The method of claim 1, wherein the at least one parameter includes a maximum allowable Rise-over-Thermal, RoT, of the cell.

3. The method of claim 2, wherein the adjusting comprises:
   obtaining the target CIR for the UE;
   calculating a RoT threshold based on at least the target CIR for the UE, a power of noise at the base station and a minimum transmit power limit of the UE;
   comparing a maximum allowable RoT of the cell with the calculated RoT threshold; and
   configuring the maximum allowable RoT of the cell to be higher than or equal to the calculated RoT threshold if the maximum allowable RoT of the cell is lower than the calculated RoT threshold.

4. The method of claim 3, wherein the RoT threshold is calculated by $$RoT\ threshold = \frac{P_{min}}{P_{noise} \cdot L} \cdot \left[ \frac{G_{div}}{CIR_{target}} + (1 - \alpha) \right]$$

where $CIR_{target}$ represents the target CIR for the UE, $G_{div}$ represents a diversity gain at the base station, $P_{min}$ represents the minimum transmit power limit of the UE, $P_{noise}$ represents a noise power at the base station, L represents a path loss between the UE and the base station, and α represents a degree of orthogonality of transmission links from the UE to the base station.

5. The method of claim 3, wherein the obtaining comprises taking a minimum CIR which supports uplink physical control channel for the UE as the target CIR.

6. The method of claim 1, wherein the at least one parameter includes an uplink data rate to be granted to the UE.

7. The method of claim 1, wherein the adjusting comprises:
   estimating the CIR for the UE in case that the UE transmits at the minimum transmit power limit, based on a power of noise at the base station, a total received power at the base station and the minimum transmit power limit of the UE;
   calculating a first uplink data rate threshold of the UE supported by the estimated CIR;
   comparing the current uplink data rate of the UE with the first uplink data rate threshold; and
   granting the UE a uplink data rate that is higher than or equal to the first uplink data rate threshold if the current uplink data rate of the UE is lower than the first uplink data rate threshold.

8. The method of claim 1, wherein the estimating comprises estimating the CIR by $$CIR = \frac{G_{div} \cdot P_{min}/L}{P_{total} + P_{noise} - (1-\alpha) \cdot P_{min}/L}$$

where $G_{div}$ represents a diversity gain at the base station, $P_{min}$ represents the minimum transmit power limit of the UE, $P_{noise}$ represents a noise power at the base station, L represents a path loss between the UE and the base station, $P_{total}$ represents a total received power at the base station and α represents a degree of orthogonality of transmission links from the UE to the base station.

9. The method of claim 1, wherein the determining comprises:
receiving an event that the UE transmit power reaches the minimum transmit power limit; and
determining that the transmit power of the UE reaches its minimum transmit power limit.

10. The method of claim 1, wherein the determining comprises:
estimating a CIR for the current uplink physical control channel for the UE; and
determining that the UE transmits at the minimum transmit power limit if the estimated CIR for the current uplink physical control channel exceed a minimum CIR which supports the uplink physical control channel for the UE by a predetermined threshold for a predetermined time period.

11. The method of claim 10, further comprising increasing discontinuous transmission, DTX, period or switching to a transmission state with less uplink physical control channel transmission when determining that the UE transmits at the minimum transmit power limit.

12. The method of claim 1, wherein the granting comprises:
determining if the current uplink data rate of the UE is lower than a second uplink data rate threshold, the second uplink data rate being lower than the first uplink data rate; and
ramping up the uplink data rate to be granted to the UE if the current uplink data rate of the UE is lower than the second uplink data rate threshold.

13. The method of claim 12, wherein the rate of ramping up is dependent on a power offset between an uplink physical data channel and the uplink physical control channel.

14. A controlling device for uplink interference suppression in a cell served by a base station of a wireless communication network, said controlling device comprising:
a determining unit adapted to determine if there is a User Equipment, UE, in the cell whose transmit power reaches its minimum transmit power limit; and
a parameter adjusting unit adapted to, when the determining unit determines that the transmit power of the UE reaches its minimum transmit power limit, adjust at least one parameter such that a Carrier-to-Interference Ratio, CIR, for the UE in case that the UE transmits at the minimum transmit power limit is not greater than a target CIR for the UE that supports the lowest grantable uplink data rate of the UE.

15. The controlling device of claim 14, wherein the at least one parameter includes a maximum allowable Rise-over-Thermal, RoT, of the cell.

16. The controlling device of claim 15, wherein the parameter adjusting unit is further adapted to
obtain the target CIR for the UE;
calculate a RoT threshold based on at least the target CIR, a power of noise at the base station and a minimum transmit power limit of the UE; and
compare a maximum allowable RoT of the cell with the calculated RoT threshold, and
configure the maximum allowable RoT of the cell to be higher than or equal to the calculated RoT threshold if the maximum allowable RoT of the cell is lower than the calculated RoT threshold.

17. The controlling device of claim 16, wherein the RoT threshold is calculated by $$RoT\ threshold = \frac{P_{min}}{P_{noise} \cdot L} \cdot \left[\frac{G_{div}}{CIR_{target}} + (1 - \alpha)\right]$$

where $CIR_{target}$ represents the target CIR for the UE, $G_{div}$ represents a diversity gain at the base station, $P_{min}$ represents the minimum transmit power limit of the UE, $P_{noise}$ represents a noise power at the base station, L represents a path loss between the UE and the base station, and a represents a degree of orthogonality of transmission links from the UE to the base station.

18. The controlling device of claim 16, wherein the determining unit is further adapted to take a minimum CIR which supports uplink physical control channel for the UE as the target CIR.

19. The controlling device of claim 14, wherein the at least one parameter includes an uplink data rate to be granted to the UE.

20. The controlling device of claim 19, wherein the parameter adjusting unit is further adapted to
estimate the CIR, for the UE in case that the UE transmits at the minimum transmit power limit, based on a power of noise at the base station, a total received power at the base station and the minimum transmit power limit of the UE;
calculate a first uplink data rate threshold of the UE supported by the estimated CIR; and
compare the current uplink data rate of the UE with the first uplink data rate threshold; and
grant the UE a uplink data rate that is higher than or equal to the first uplink data rate threshold if the current uplink data rate of the UE is lower than the first uplink data rate threshold.

21. The controlling device of claim 20, wherein the parameter adjusting unit is further adapted to estimate the CIR in case that the UE transmits at the minimum transmit power limit by $$CIR = \frac{G_{div} \cdot P_{min}/L}{P_{total} + P_{noise} - (1 - \alpha) \cdot P_{min}/L}$$

where $G_{div}$ represents a diversity gain at the base station, $P_{min}$ represents the minimum transmit power limit of the UE, $P_{noise}$ represents a noise power at the base station, L represents a path loss between the UE and the base station, $P_{total}$ represents a total received power at the base station and $\alpha$ represents a degree of orthogonality of transmission links from the UE to the base station.

22. The controlling device of claim 20, wherein the determining unit is further adapted to:
receive an event that the UE transmit power reaches the minimum transmit power limit; and
determine that the transmit power of the UE reaches its minimum transmit power limit.

23. The controlling device of claim 20, wherein the determining unit is further adapted to:
estimate a CIR for the current uplink physical control channel for the UE; and
determine that the UE transmits at the minimum transmit power limit if the estimated CIR for the current uplink physical control channel exceed a minimum CIR which supports the uplink physical control channel for the UE by a predetermined threshold for a predetermined time period.

24. The controlling device of claim 23, wherein the parameter adjusting unit is further adapted to increase discontinuous transmission, DTX, period or switching to a transmission state with less uplink physical control channel transmission when determining that the UE transmits at the minimum transmit power limit.

25. The controlling device of claim 20, wherein the determining unit is further adapted to determine if the current uplink data rate of the UE is lower than a second uplink data rate threshold, the second uplink data rate being lower than the first uplink data rate, and the parameter adjusting unit is further adapted to ramp up the uplink data rate to be granted to the UE if the current uplink data rate of the UE is lower than the second uplink data rate threshold.

26. The controlling device of claim 25, wherein the rate of ramping up is dependent on a power offset between an uplink physical data channel and the uplink physical control channel.

* * * * *